(12) United States Patent
Samuel et al.

(10) Patent No.: US 8,471,758 B2
(45) Date of Patent: Jun. 25, 2013

(54) VIRTUAL APERTURE RADAR (VAR) IMAGING

(75) Inventors: Alphonso A. Samuel, Tucson, AZ (US); Robert M. Pawloski, Tucson, AZ (US); Nathan A. Goodman, Oro Valley, AZ (US)

(73) Assignees: Raytheon Company, Waltham, MA (US); The Arizona Board of Regents on behalf of the University of Arizona, Tucson, AZ (US)

( * ) Notice: Subject to any disclaimer, the term of this patent is extended or adjusted under 35 U.S.C. 154(b) by 335 days.

(21) Appl. No.: 13/024,957

(22) Filed: Feb. 10, 2011

(65) Prior Publication Data

US 2012/0268309 A1    Oct. 25, 2012

(51) Int. Cl.
*F41G 7/28*    (2006.01)
*G01S 13/90*    (2006.01)

(52) U.S. Cl.
USPC .......................................... 342/62; 342/25 A

(58) Field of Classification Search
USPC ........................................ 342/25 R–25 F, 62
See application file for complete search history.

(56) References Cited

U.S. PATENT DOCUMENTS

| | | | |
|---|---|---|---|
| 4,532,515 A | 7/1985 | Cantrell et al. | |
| 5,017,929 A | 5/1991 | Tsuda | |
| 5,053,784 A | 10/1991 | Hippelainen | |
| 5,182,562 A | 1/1993 | Witte | |
| 5,285,209 A | 2/1994 | Sharpin et al. | |
| 5,572,220 A | 11/1996 | Cai | |
| 6,104,346 A | 8/2000 | Rudish et al. | |
| 6,218,979 B1 | 4/2001 | Barnes et al. | |
| 6,486,827 B2 | 11/2002 | Small | |
| 6,653,973 B2 | 11/2003 | Yu | |
| 2011/0222781 A1* | 9/2011 | Nguyen et al. | ................ 382/218 |

OTHER PUBLICATIONS

Wei et al. "Sparse Reconstruction for SAR Imaging Based on Compressed Sensing". Progress in Electromagnetics Research. vol. 109. pp. 63-81. 2010.*
Wang et al. "Adaptive imaging for forward-looking ground penetrating radar," IEEE Transactions on Aerospace and Electronic Systems, vol. 41, No. 3, Jul. 2005, pp. 922-934.
Candes et al. "People hearing without listening: an introduction to compressive sampling," Applied and Computational Mathematics, California Institute of Technology, Pasadena, CA, pp. 1-19.

(Continued)

*Primary Examiner* — Matthew M Barker
(74) *Attorney, Agent, or Firm* — Eric A. Gifford

(57) ABSTRACT

Virtual Aperture Radar (VAR) imaging provides terminal phase radar imaging for an airborne weapon that can resolve multiple closely-spaced or highly correlated scatterers on a given target with a single pulse to provide an aimpoint update at a useful range to target without training data and without requiring a large aperture antenna. VAR imaging exploits the sparse, dominant-scatterer nature of man-made targets. The array manifold is constructed with a large number of basis functions that are parameterized by range or angle (or both) to target. The number of basis functions extends the capability to resolve scatterers beyond the Rayleigh resolution. However, this also makes the manifold underdetermined. A sparse reconstruction technique that places a sparsity constraint on the number of scatterers is used to solve the manifold to uniquely identify the ranges or angles to the scatterers on the target. These updates are passed to the weapon's guidance system, which in turn generates command signals to actuate aerodynamic surfaces such as fins or canards to steer the weapon to the target.

20 Claims, 13 Drawing Sheets

OTHER PUBLICATIONS

Van Den Berg et al., "Probing the pareto frontier for basis pursuit solutions," 2008 Society for Industrial and applied Mathematics, SIAM J. Sci Comput. vol. 31, No. 2, pp. 890-912.

Chen et al., "Atomic Decomposition by basis pursuit," 1998 Society for Industrial and applied Mathematics, SIA M J. Sci Comput. vol. 20, No. 1, pp. 33-61.

Fannjiang et al., Compressed Remote Sensing of Sparse Objects, Department of Mathematics, University of California, Davis, CA, pp. 1-22.

Candes et al., "An introduction to Compressive Sampling," IEEE Signal Processing Magazine, March 2008, pp. 21-30.

Baraniuk et al., "Compressive radar imaging," IEEE Radar Conference, Waltham, MA, Apr. 2007, pp. 1-6.

Smith et al., "Compressed Sampling for Pulse Doppler Radar," Center for Advanced Communications Villanova University, Villanova, PA, pp. 1-6.

Suwa et al., "Forward Looking Radar Imaging Method Using Multiple Receiver Antennas and Digital Beam Forming Technique," Information Technology R&D Center, Mitsubishi Electric Corporation 5-1-1 Ofuna, Kamakura, Kanagawa 247-8501, Japan, pp. 4041-4044.

Dai et al., "High Resolution Imaging for Forward Looking SAR With Multiple Receiving Antennas," 'Dept. Electronic Eng., Jinan University, 5 10632 Guangzhou, China, pp. 2254-2256.

Herman et al., "High-Resolution Radar via Compressed Sensing," To Appear in IEEE Transactions on Signal Processing, pp. 1-10.

A.K.Lohner, "Improved azimutal resolution of forward looking SAR by sophisticated antenna illumination function design," IEE Proc -Radar, Sonar Navig , vol. 145. No. 2, Apr. 1998, pp. 128-134.

Peyton Z. Peebles, Jr., "Radar Principles," A Wiley-Interscience Publication, 1998 by John Wiley & Sons, pp. 265-271.

Xiaozhen et al., "Research of Three-Dimensional Imaging Processing for Airborne Forward-Looking SAR," The Institute of electronics, Chinese Academy of Sciences, China, pp. 1-4.

Yang et al., "Signal Analysis of Forward Looking SAR System," Department of Electronic Engineering University of Electronic Science and Technology of China Chengdu, Sichuan 610054, P. R. China, pp. 140-148.

Potter et al., "Sparse Reconstruction for Radar," Dept. of Electrical & Computer Enginerring, The Ohio Statue University, Columbus, OH, pp. 1-15.

Dai et al.,"System Configuration and Processing Method for Forward Looking SAR With Two Receiving Antennas," Towards Digital Earth—Proceedings of the International Symposium on Digital Earth Science Press ,1999, pp. 1-7.

* cited by examiner $$\underbrace{\begin{bmatrix} x_1 \\ x_2 \\ x_3 \\ x_4 \\ \vdots \\ x_Q \end{bmatrix}}_{\text{ANTENNA ELEMENT}} = \underbrace{\begin{bmatrix} a_1(\theta_1, \varphi_1) & a_1(\theta_1, \varphi_2) & \cdots & a_1(\theta_{M_1}, \varphi_{M_2}) \\ a_2(\theta_1, \varphi_1) & a_2(\theta_1, \varphi_2) & \cdots & a_2(\theta_{M_1}, \varphi_{M_2}) \\ \vdots & \vdots & \cdots & \\ a_Q(\theta_1, \varphi_1) & a_Q(\theta_1, \varphi_2) & \cdots & a_Q(\theta_{M_1}, \varphi_{M_2}) \end{bmatrix}}_{\text{ARRAY MANIFOLD}} \underbrace{\begin{bmatrix} \sigma_1 \\ \sigma_2 \\ \vdots \\ \sigma_{M_1 M_2} \end{bmatrix}}_{\substack{\text{SIGNAL} \\ \text{COEFFICIENT}}} + \underbrace{\begin{bmatrix} n_1 \\ n_2 \\ n_3 \\ n_4 \\ \vdots \\ n_Q \end{bmatrix}}_{\text{NOISE}}$$

Q = NUMBER OF CHANNELS
$M_1$ = NUMBER OF FINELY SPACED CELLS IN ANGLE DIMENSION #1 ($\theta$)
$M_2$ = NUMBER OF FINELY SPACED CELLS IN ANGLE DIMENSION #2 ($\varphi$)

$$a(\theta_{m_1}, \varphi_{m_2}) = \exp\left( \frac{j2\pi \cdot (d_x \sin(\theta_{m_1}) \cos(\varphi_{m_2}) + d_y \sin(\varphi_{m_2}))}{\lambda} \right)$$

FIG.7

$$\underbrace{\begin{bmatrix} x_1 \\ x_2 \\ \vdots \\ x_N \end{bmatrix}}_{\text{FAST-TIME MEASUREMENTS}} = \underbrace{\begin{bmatrix} a_1(\tau_1) & a_1(\tau_2) & \cdots & a_1(\tau_M) \\ a_2(\tau_1) & a_2(\tau_2) & \cdots & a_2(\tau_M) \\ \vdots & \vdots & \cdots & \vdots \\ a_N(\tau_1) & a_N(\tau_2) & \cdots & a_N(\tau_M) \end{bmatrix}}_{\text{SIGNAL MANIFOLD}} \underbrace{\begin{bmatrix} \sigma_1 \\ \sigma_2 \\ \vdots \\ \sigma_M \end{bmatrix}}_{\substack{\text{SIGNAL} \\ \text{COEFFICIENTS}}} + \underbrace{\begin{bmatrix} n_1 \\ n_2 \\ n_3 \\ n_4 \\ \vdots \\ n_N \end{bmatrix}}_{\text{NOISE}}$$

106

N = NUMBER OF FAST-TIME SAMPLES PER PULSE
M = NUMBER OF FINELY SPACED RANGE GRID CELLS
$a_i(\tau_m) = \exp(-j2\pi\gamma n T_s(\tau_m - \tau_0))$ WHERE $T_s$ IS THE FAST-TIME SAMPLE RATE, $\tau_0$ IS THE TIME OF REFLECTION FOR MIDDLE OF RANGE SWATH (I.E., THE DE-CHIRP REFERENCE RANGE), $\tau_M$ IS THE RANGE DELAY OF THE mTH RANGE GRID CELL, AND $\gamma$ IS THE LFM CHIRP RATE.

FIG.9

$$\begin{bmatrix} x_1 \\ x_2 \\ x_3 \\ x_4 \\ \vdots \\ x_{NQ} \end{bmatrix} = \begin{bmatrix} a_1(\theta_1,\varphi_1,\tau_1) & a_1(\theta_1,\varphi_1,\tau_2) & \cdots & a_1(\theta_{M_1},\varphi_{M_2},\tau_M) \\ a_2(\theta_1,\varphi_1,\tau_1) & a_2(\theta_1,\varphi_1,\tau_2) & \cdots & a_2(\theta_{M_1},\varphi_{M_2},\tau_M) \\ \vdots & \vdots & & \vdots \\ a_{NQ}(\theta_1,\varphi_1,\tau_1) & a_{NQ}(\theta_1,\varphi_1,\tau_2) & \cdots & a_{NQ}(\theta_{M_1},\varphi_{M_2},\tau_M) \end{bmatrix} \begin{bmatrix} \sigma_1 \\ \sigma_2 \\ \vdots \\ \sigma_{M_1 M_2 M} \end{bmatrix} + \begin{bmatrix} n_1 \\ n_2 \\ n_3 \\ n_4 \\ \vdots \\ n_{NQ} \end{bmatrix}$$

ANTENNA ELEMENTS AND FAST-TIME SAMPLES — JOINT RANGE-ANGLE SIGNAL MANIFOLD (124) — SIGNAL COEFFICIENT — NOISE

FIG. 11

VIRTUAL APERTURE RADAR (VAR) IMAGING

BACKGROUND OF THE INVENTION

1. Field of the Invention

This invention relates to radar imaging airborne weapons, and more particularly to super-resolution radar imaging of range-to-target and angle-to-target during the weapon's terminal phase or endgame.

2. Description of the Related Art

A radar imaging airborne weapon such as a missile, smart projectile etc. engaging a target is expected to move through a phase where high-resolution imagery such as synthetic aperture radar imaging is used to detect, identify, and classify ground targets. A particular target of interest will then become the chosen destination of the weapon. In an air-to-air encounter, a target at far range is treated as a point source target in the acquisition and midcourse guidance portion of flyout. In both cases, individual scatterers on the target begin to resolve as the weapon closes to within a few kilometers of the target, thus requiring imaging and angle exploitation techniques that can handle multiple scatterers.

At the beginning of the imaging stage, the weapon has a velocity vector that is not pointed directly at the scene of interest (i.e. it is flying a squinted trajectory). The angle between the velocity vector and the region of interest is generally 10-20 degrees depending on velocity, frequency, and resolution requirements. This imaging step can be expected to last until about 1.5-3 kilometers away from the target. Once this distance of 1.5-3 kilometers is reached, the weapon will begin what is commonly referred to as endgame or terminal phase. The weapon will turn toward the target to engage it. At this point, with the velocity vector pointing almost directly at the target of interest (zero squint), the weapon's radar suffers a loss in cross-range resolution due to its small physical antenna aperture and approximate co-alignment of range and Doppler contours. Despite this loss in resolution, the weapon must maintain a precise aimpoint to the target of interest or risk missing its objective. Aimpoint selection is further complicated by the fact that the endgame geometry changes rapidly (e.g., the target rapidly fills the antenna beam as the weapon approaches at a high rate of speed).

Another challenge encountered in the terminal phase of detection and localization of ground targets is that clutter may be folded into the target. The signal to noise (SNR) ratio is greatly increasing as range decreases, but clutter power increases also. As a result, the ability to directly detect the target becomes extremely difficult as the squint goes to zero and the target begins to fill the entire radar beam. Another problem that is encountered in both air-to-air and air-to-ground scenarios is the phenomenon of glint. As the weapon rapidly approaches the target, the coherent sum of the target's dominant scatterers changes rapidly, which can cause wide apparent variations in the target's aimpoint when using techniques such as monopulse.

Geometry greatly impacts the processing required to find an accurate aimpoint. The geometry of interest consists of a forward-looking antenna beam pattern that is directed in the same direction as the velocity vector of the weapon (zero squint). This geometry results in Doppler resolution cells that are larger than the beamwidth of the antenna. This is because the Doppler shifts of scatterers at the edges of the beam are nearly identical to the Doppler shifts of scatterers at the center of the beam. For example, consider a Ka-band radar traveling at 300 m/s directly along its line-of-sight vector. For an antenna beamwidth of 3 degrees, the Doppler shift of one side of the beam relative to the center of the beam is:

$$\Delta f_D = \frac{2|\overline{V}_{radar}|}{\lambda}[\cos(0°) - \cos(1.5°)] = \frac{2 \cdot 300}{.0086}[\cos(0°) - \cos(1.5°)] = 24 \text{ Hz} \quad (1)$$

where a common radar operating wavelength of $\lambda=0.86$ cm has been used. If the radar pulse repetition frequency (PRF) is 40 kHz and the coherent processing interval (CPI) consists of 512 pulses, the resulting Doppler resolution is 78 Hz ($\approx$40 kHz/512), which means that all of the returns from stationary objects in the main beam, including the target, fall into a single Doppler bin. In this geometry, it is not possible to use Doppler processing to achieve fine cross-range resolution.

Due to lack of Doppler resolution, on-target azimuth and elevation angles must be determined from spatial degrees of freedom. However, given a small antenna aperture with a small number of channels of data (spatial degrees of freedom), obtaining accurate angle estimates is a difficult task as well. A simple but accurate approximation to an antenna's 3-dB beamwidth in a particular plane is to take the ratio of the radar's operating wavelength to the length of the antenna in that plane. For a radar seeker, the antenna aperture is usually circular, so the antenna beamwidth in any plane can be approximated as $$BW_{3dB} \approx \frac{\lambda}{D} \quad (2)$$

where D is the antenna's diameter. For a 6-inch weapon operating at Ka band, the resulting 3-dB beamwidth is ~0.056 radians or ~3.2 degrees. Furthermore, the antenna's 3-dB beamwidth can be considered a measure of its Rayleigh or correlation-based resolution. At the beginning of the terminal phase at approximately 3 km from the target, the resulting spatial resolution is $$\delta_{BW} \approx R \cdot BW_{3dB} = 168 \text{ m}. \quad (3)$$

Even when the sensor reaches a range of 1.5 km, the resolution is still 84 m. Herein lies the difficulty with real-aperture imaging—the beam limited resolution is proportional to target range, which results in poor cross-range resolution in the radar far field. As the weapon closes on the target, then resolution improves, but by the time individual scattering centers on the target can be resolved, it is too late to adjust course. Therefore, it is imperative to exploit angle estimation or imaging techniques that are more sophisticated than traditional antenna beamforming. Because of the geometry and small antenna aperture, high range resolution is available, but (as described above) angle and Doppler resolution are poor. Thus, an on-target aimpoint must be determined from limited spatial degrees of freedom via monopulse measurement or super-resolution techniques such as maximum likelihood (ML), MUSIC, ESPRIT, or beamforming.

The most common approach is to use some sort of monopulse technique for the target of interest. However, as the weapon approaches a target, the "glint" phenomenon (also known as angular noise) caused by the changing coherence of the scatterers gives rise to rapidly changing signal responses (scintillation). Given a four-channel antenna, we define A, B, C, and D as the measurements taken at the same time instant across the four channel quadrants. Let $\Sigma = A + B + C + D$ be the sum channel complex signal (V) and $\Delta_\theta$ be the delta channel complex signal (V). The delta channel is either $\Delta_\theta = A+B-(C+D)$ or $\Delta_\theta = A+C-(B+D)$ depending on the desired plane of the angle estimate. Given a sum channel value and a delta channel value, a monopulse angle estimate can be formed as either $$\hat{\theta} = \frac{1}{k_m} \text{Re}\left(\frac{\Delta_\theta}{\Sigma}\right) \quad (4)$$

$$\hat{\theta} = \frac{1}{kd} \tan^{-1}\left(-j\frac{\Delta_\theta}{\Sigma}\right) \quad (5)$$

where $k_m$ is an antenna-dependent monopulse slope factor.

Aimpoint localization performance via monopulse techniques is severely limited by the efficacy of glint mitigation. Another limiting factor of monopulse is that it provides only one angle estimate. The angle estimate may successfully latch onto a dominant scatterer as desired or may latch onto a centroid of multiple scatters or an estimate that lies outside of the target frame. Unfortunately, there is no easy method for detecting or predicting when this detrimental scenario has occurred.

Other super-resolution techniques such as MUSIC, ESPRIT, maximum likelihood, and others are severely limited by the number of signals they are able to detect, require large apertures with many channels, have trouble resolving closely spaced or highly correlated signals, and/or require large sets of training data. In general a single-pulse representation of a signal measured across the antenna array at a particular instant in time can be modeled as a linear combination of spatial basis functions according to $$x(z) = \sum_k \sigma_k \alpha_k(z) \quad (6)$$

where $x(z)$ is the signal to be reconstructed along the spatial coordinate z, $\Delta_k(z)$ is the spatial basis function corresponding to the kth source, and the $\sigma_k$'s are the signal/source coefficients. A sampled signal (sampled at particular points in space by the antenna) can be expressed in matrix-vector notation as $$x = As + n \quad (7)$$

where the matrix A has basis vectors (sampled versions of $\alpha_k$(z)) as its columns, the column-vector s contains the signal coefficients, and the vector n is the noise introduced to the measurement.

Approaches such as MUSIC and maximum likelihood use covariance-based methods to resolve multiple signals. They take multiple samples of x over time to compute a sample covariance matrix as:

$$R = E[xx^H]. \quad (8)$$

MUSIC then searches for basis functions (in this case the antenna steering vectors) that are orthogonal to the noise-only subspace of R. If a basis function (steering vector) is orthogonal to the noise subspace, then it is assumed that this steering vector points to a signal (i.e. a nonzero signal coefficient $\sigma_k$ has been found. Maximum likelihood methods perform a brute-force search for the combination of basis functions (steering vectors) that best explain the sample covariance matrix. In both cases, it is necessary to detect the number of sources (i.e., scattering centers) present in the data, and incorrectly detecting the number of sources can affect performance significantly. Furthermore, it takes time to properly train the required covariance matrix, which is a problem in this application because the geometry can change during the training period.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides terminal phase radar imaging for an airborne weapon that can resolve multiple closely spaced or highly correlated scatterers on a given target with a single pulse to provide an aimpoint update at a useful range to target without training data and without requiring a large aperture antenna. The approach can resolve the range-to-target or angle(s)-to-target with a resolution that exceeds the Rayleigh resolution bound imposed by the physics of the transmitted pulse or antenna aperture.

This is accomplished by exploiting the sparse, dominant-scatterer nature of man-made targets. The array manifold is constructed with a large number of basis functions that are parameterized by range or angle (or both) to target. The number of basis functions extends the capability to resolve scatterers beyond the Rayleigh resolution. However, this also makes the manifold underdetermined. A sparse reconstruction technique that places a sparsity constraint on the number of scatterers is used to solve the manifold to uniquely identify the ranges or angles to the scatterers on the target. These updates are passed to the weapon's guidance system, which in turn generates command signals to actuate aerodynamic surfaces such as fins or canards to steer the weapon to the target.

In an embodiment, terminal phase radar imaging for determining aimpoint measurements from an airborne weapon to multiple scatterers on a target comprises transmitting an RF pulse via an antenna array at the target. The bandwidth of the RF pulse or a size of an aperture of the antenna array establishing a Rayleigh resolution as a bound for range or angle measurement resolution, respectfully. A return pulse reflected off the multiple scatterers on the target is received and sampled at the antenna array. The antenna array is coupled to a spatial array of time-sampled receiver channels to generate a data cube that spans the spatial array and sampling period. Each complex value in the data cube has an amplitude and phase. A system of equations $x = As + n$ is set up in an aimpoint computer, where each row of data measurement vector x is a measured complex value for one of the receivers, each column of measurement manifold A is a basis function parameterized by an angle or range to the target, each row of scatterer vector s is a scattering coefficient corresponding to a particular angle or range, and n is noise. The number of basis functions is greater than the length of the measurement vector x. The number of basis functions determines a threshold resolution for resolving scatters on the target that exceeds the Rayleigh resolution while making the system of equations underdetermined. The aimpoint computer executes program instructions for sparse reconstruction to uniquely solve for scattering coefficients s subject to a sparsity constraint on the number of scatterers. The non-zero scattering coefficients identify the ranges or angles for the scatters on the target. The updated range or angles for the multiple scatterers are handed off to the weapon's guidance computer, which in turn generates command signals to actuate aerodynamic surfaces such as fins or canards to steer the weapon to the target.

These and other features and advantages of the invention will be apparent to those skilled in the art from the following detailed description of preferred embodiments, taken together with the accompanying drawings, in which:

BRIEF DESCRIPTION OF THE DRAWINGS

FIG. 7 is a diagram of an angle/angle only manifold;

FIG. 9 is a diagram of a range only manifold;

FIG. 11 is a diagram of a joint range/angle manifold; and

DETAILED DESCRIPTION OF THE INVENTION

Figure 1:
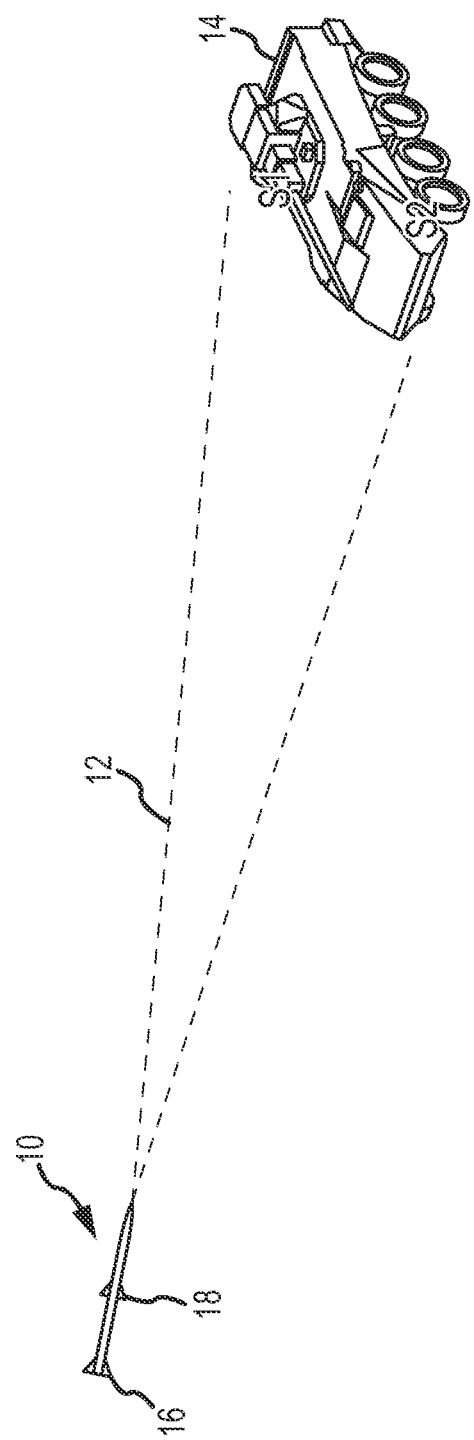
FIG. 1 is a diagram of a radar imaging weapon during terminal phase.

The present invention provides terminal phase radar imaging for an airborne weapon such as an air, land, sea or spaced-based launched missile, rocket or projectile that can resolve multiple closely-spaced or highly correlated scatterers on a given target. The radar imaging may use a single pulse to provide an aimpoint update without training data and without requiring a large aperture antenna. The approach can resolve the range-to-target or angle(s)-to-target (or both) with a resolution that exceeds the Rayleigh resolution bound otherwise imposed by the physics of the transmitted pulse or antenna aperture.

Virtual Aperture Radar (VAR) imaging provides reliable angle measurements both in azimuth and elevation by using few radar pulses (in fact, as few as one pulse) and innovative image reconstruction techniques. VAR defines a measurement manifold in which the number of columns (basis functions) is much greater than the length of the measurement vector. This effectively defines a measurement model with underlying resolution better than the Rayleigh limit otherwise imposed by the antenna array or pulse. Such a manifold is underdetermined, but by enforcing a sparsity constraint according to the principles of compressed sensing and sparse reconstruction, VAR provides a unique solution.

Consider, for example, reconstruction of a time-domain signal that is known to be a linear combination of a few sinusoids. The coefficients, frequencies, and exact number of sinusoids are unknown a priori, but it is known that the number of sinusoidal components is small. A model for the signal can be posed according to $$x(t) = \sum_{k=1}^{K} \sigma_k \exp(j2\pi F_k t) \quad (9)$$

where $F_k$ is the frequency of the kth frequency component, t is time, and our prior knowledge indicates that K is a small number. Now assume that N samples of the signal are collected in time at a uniform rate greater than or equal to the Nyquist rate. The sampled signal is now $$x(nT_s) = x[n] = \sum_{k=1}^{K} \sigma_k \exp(j2\pi F_k n T_s); \quad n \in [0, 1, \ldots, N-1], \quad (10)$$

which can be expressed in matrix-vector form as x=As where $$x = [x[0]x[0] \ldots x[N-1]]^T, \quad (11)$$

$$A = [a(F_1)a(F_2) \ldots a(F_K)], \quad (12)$$

where $$a(F_k) = [1 \exp(j2\pi F_k T_s) \ldots \exp(j2\pi F_k(N-1)T_s)]^T, \quad (13)$$

$$s = [\sigma_1 \sigma_2 \ldots \sigma_K]^T, \quad (14)$$

and $[\cdot]^T$ denotes the transpose operator. A reconstruction statement can be formulated that says: having obtained the measurements x, find the variables $F_1, \ldots, F_K, \sigma_1, \ldots, \sigma_K$ such that x=As. Furthermore, in this problem statement, the solution itself specifies which frequencies are present in the signal and the result is a spectral estimate. This statement is a consequence of the fact that the basis signals are sinusoids and solution vector describes the coefficients of those sinusoids.

The signal parameter space is divided into a grid and the grid is searched for the best solution. A manifold matrix is defined as $$\tilde{A} = [a(F_1)a(F_2) \ldots a(F_M)] \quad (15)$$

where $F_1, \ldots, F_M$ are uniformly spaced frequencies spanning the observable spectrum. The observed signal x is said to reside or exist on the manifold described by the columns of $\tilde{A}$. If M=N and the frequencies are properly chosen, then $\tilde{A}$ will be a square, full-rank matrix and a unique vector $\tilde{s}$ that solves $x = \tilde{A}\tilde{s}$ is guaranteed to exist. However, the prior knowledge of signal sparsity has not been applied. In fact, the solution $\tilde{s}$ is not likely to be "sparse" even if there is only a single frequency present. If the frequency component(s) happen to straddle the frequencies that define the columns of $\tilde{A}$, than the solution vector $\tilde{s}$ will have many non-zero coefficients in a sinc-like pattern around the true frequency. To avoid this situation, one strategy is to form an overcomplete manifold by oversampling the frequency grid such that the number of columns in $\tilde{A}$ is much greater than the number of rows (i.e., M>>N). This strategy ensures that the mismatch between any frequencies present in the signal and those represented in the manifold matrix is minimized. Unfortunately, this strategy also causes the solution to be underdetermined or non-unique, and an additional criterion is needed to select a solution.

The problem of a non-unique solution is solved by incorporating a sparsity constraint on the solution to $x = \tilde{A}\tilde{s}$ and solving an optimization problem. Let the $L_0$ norm of a vector be equal to the number of non-zero entries in the vector. The ideal way to implement a sparsity constraint would be to solve the optimization problem defined by $$\min_{\tilde{s}} \|\tilde{s}\|_0 \text{ such that } \|x - \tilde{A}\tilde{s}\|_2 < \varepsilon \quad (16)$$

where $\|\tilde{s}\|_0$ denotes the $L_0$ norm of $\tilde{s}$. In other words, the optimization finds a sufficiently good fit to the measured data that uses the fewest basis functions possible. Tying the mathematics back to the problem of endgame target imaging, an $L_0$ constraint would be equivalent to describing the data using the fewest possible number of target scattering centers. Unfortunately, $L_0$ optimization is a numerically challenging problem, so the usual approach is to use $L_1$ optimization instead where the $L_1$ norm of a vector is defined as the sum of the magnitudes of the vector's elements. The optimization under an $L_1$ constraint is than $$\min_{\tilde{s}} \|\tilde{s}\|_1 \text{ such that } \|x - \tilde{A}\tilde{s}\|_2 < \varepsilon. \quad (17)$$

As mentioned above, the signal representation basis $\tilde{A}$ is represented on a finely spaced grid in parameter space to help ensure the existence of a sparse solution. Note, an alternate optimization would be to minimize the $L_2$ norm subject to a constraint on the $L_0$ or $L_1$ norm.

Referring now to the figures, terminal phase radar imaging for aimpoint estimation is based on sparse reconstruction. The approach exploits the structure of man-made objects, which often appear to a radar as a small, finite number of dominant scatterers. With this statement in mind, a proper basis for the observed measurements, parameterized by scattering coefficients in angle and/or range is defined. The sparsity-based reconstruction will find the dominant scatterers in this model.

As shown in FIG. 1, an airborne weapon 10 transmits an RF pulse within a beam 12 to illuminate a ground surface including a man-made target 14. To the weapon's radar target 14 appears as a small, finite number of dominant scatterers S1, S2 etc. The weapon processes the radar return to estimate the range or angle(s) (or both) to each of these dominant scatters. The weapon's guidance system uses these updates to generate command signals to actuate aerodynamic surfaces such as fins 16 or canards 18 to steer the weapon 10 to the target 14. In accordance with the present invention, the weapon's radar imaging can resolve multiple closely-spaced or highly correlated scatterers on a given target with a single pulse to provide an aimpoint update at a useful range to target without training data and without requiring a large aperture antenna. The radar imaging can resolve the range-to-target or angle(s)-to-target with a resolution that exceeds the Rayleigh resolution bound imposed by the physics of the transmitted pulse or antenna aperture. The terminal phase radar imaging may be "guidance-cued" in that it receives estimates of the range-to-target and angle(s)-to-target from the launch platform or from midcourse techniques used to acquire, classify and track the target prior to entering the terminal phase. However, all that is required is that the antenna is pointed so that the target lies within, for example, the 3 dB bandwidth of the antenna.

Figure 2:
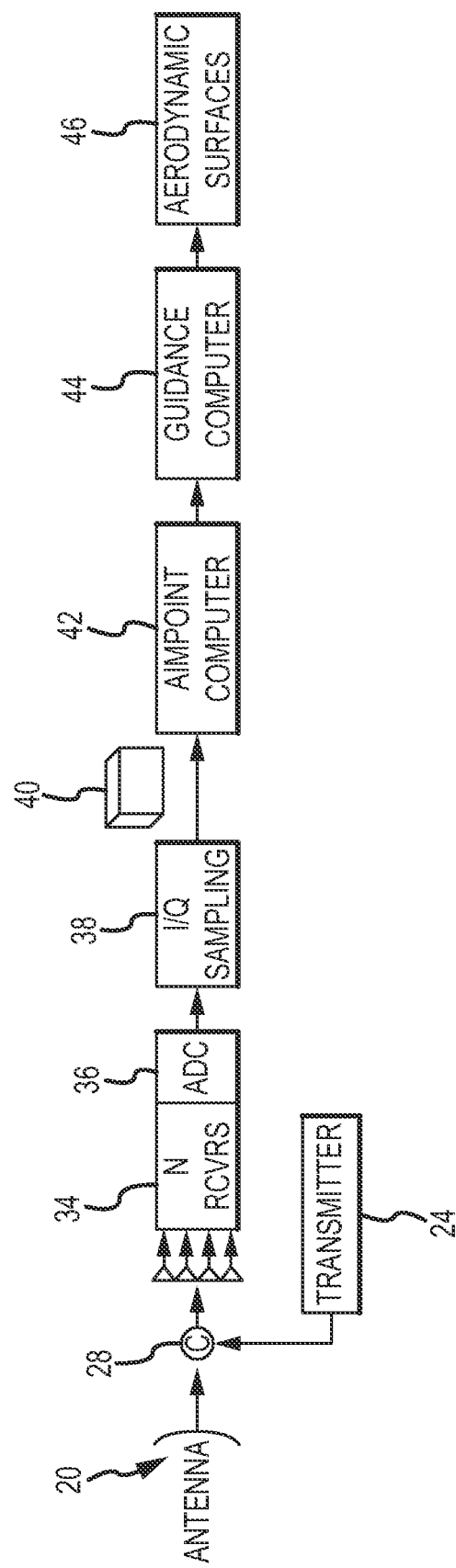
FIG. 2 is a block diagram of a radar imaging and guidance system for a weapon.
Figure 3:
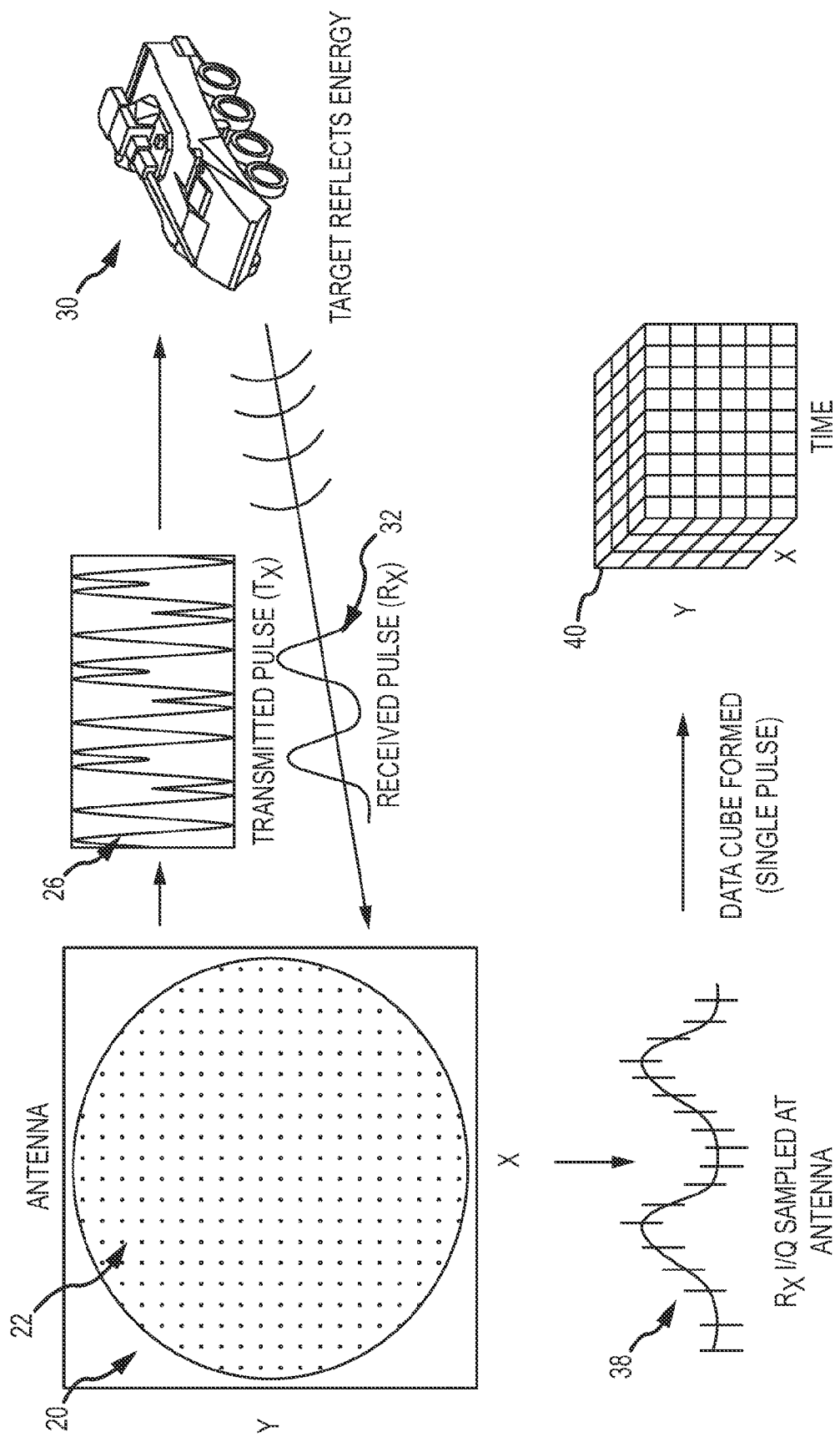
FIG. 3 is a diagram for transmitting an RF pulse off a target to form a data cube.

As shown in FIGS. 2 and 3, a weapon comprises an antenna array 20 including multiple antenna elements 22 that together have an effective aperture size D. A transmitter 24 generates a transmitted RF pulse 26 such as a linear FM waveform that is directed via a circulator 28 to the antenna array 20 that transmits the pulse in a beam within the bandwidth (e.g. X-band or Ka-band) of the antenna. A target 30 reflects the energy in transmit pulse 26 in the form of a received RF pulse 32 back to antenna array 20. The elements 22 of antenna array 20 are coupled to a spatial array of receivers 34 that form N phase centers. Each receiver 34 is coupled to one or more antenna elements 22 and converts the received electromagnetic energy in the received RF pulse into an analog electrical signal. Each receiver is coupled to an analog-to-digital converter (ADC) 36 that converts the analog electrical signal to a digital electrical signal. Each digital signal is I/Q sampled 38 to produce $N_f$ fast time phase/amplitude data at each of the N phase centers. This produces a "data cube" 40 having x, y coordinates that correspond to the spatial array of receivers 34 and a time index that corresponds to each successive sample. Each cell in the data cube includes a complex value having an amplitude and phase. An aimpoint computer 42 processes the data cube to compute range and angle estimates to the target. The aimpoint computer executes program instructions to first set up one or more array manifolds of samples parameterized by range or angle (or both) and then to solve the manifold(s) using sparse reconstruction. The aimpoint computer may use standard techniques to estimate range-to-target and reduce the data cube, and then apply sparse reconstruction to estimate angle(s)-to-target. Alternately, the aimpoint computer may use sparse reconstruction to estimate both the range and angle(s), either seperably or jointly. The range and angle updates are handed-off a guidance computer 44 that computes command signals to control aerodynamic surfaces 46 to maneuver the weapon to the target.

Figure 4:
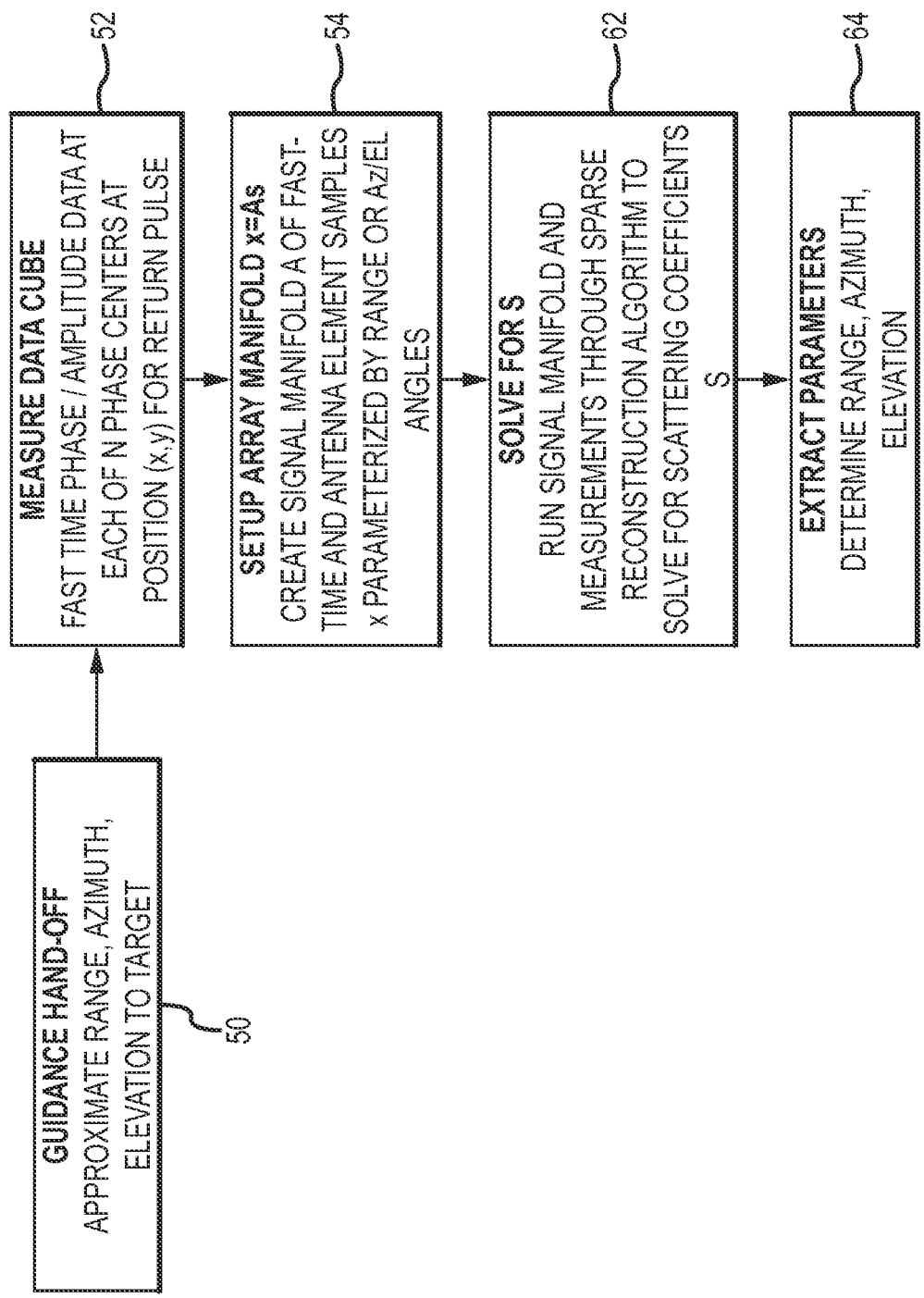
FIG. 4 is a flow diagram for using sparse reconstruction techniques to superresolve range-to-target or angle-to-target during terminal phase.
Figure 5:
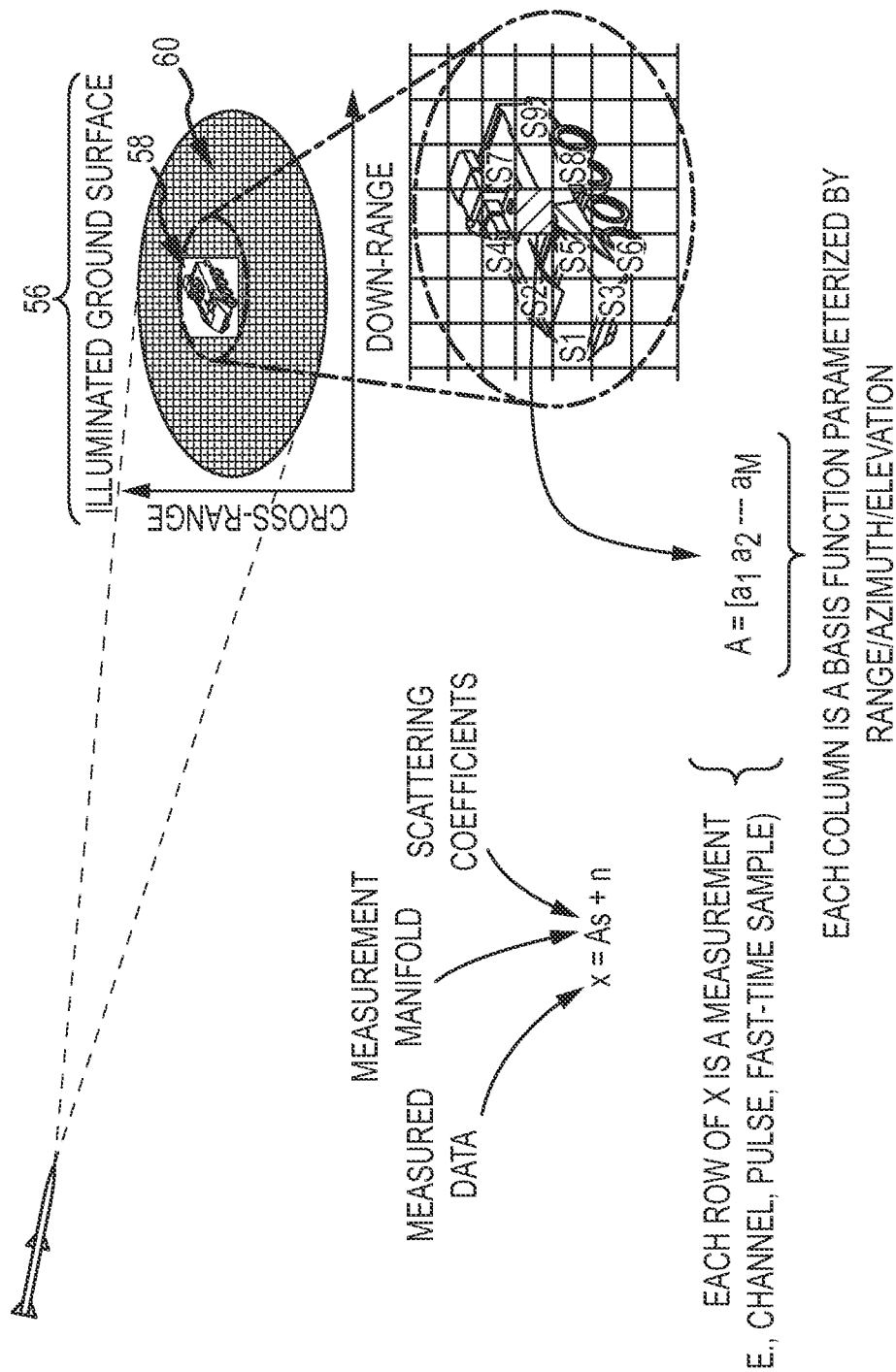
FIG. 5 is a diagram the division of the illuminated ground surface including target into a fine grid.

Referring now to FIGS. 4 and 5, in an embodiment of terminal phase radar imaging, the process of terminal phase radar imaging starts with a guidance hand-off (step 50) of approximate range and approximate azimuth (Az) and elevation (El) angles to target. The radar imaging system measures a data cube (step 52) of fast time phase/amplitude data at each of N phase centers at positions (x,y) for a return pulse. The aimpoint computer sets up an overcomplete array manifold (x=As) including a signal manifold A of fast-time and antenna element samples x parameterized by range or Az/El angle(s) (step 54). Each column of measurement manifold A is a basis function parameterized by an angle or range to the target, where the number of basis functions satisfies M>N where N is the length of measurement vector x.

The overcomplete manifold divides the illuminated ground surface 56 (including target 58) into a fine grid of cells 60 as shown in FIG. 5. The cells are divided several times more finely than the size suggested by traditional Rayleigh resolution. Each cell has a different position vector and, therefore, a different steering vector. The cells are ordered, and the steering vector for the kth cell is placed as the kth column of the overcomplete manifold matrix A. If a scatterer is located at the kth cell position, then the kth entry of the coefficient vector $\tilde{s}$ should be non-zero. For every cell that does not contain a scatterer, the corresponding entry of the coefficient vector is zero. Thus, although the system of equations is underdetermined, the aimpoint computer can uniquely solve for the scattering coefficients s using sparse reconstruction (step 62). The computer extracts the range or azimuth or elevation parameters from s (step 64), the elements of s describing the location, in range or angle(s), and the strength of scatterers within the illumination beam.

Consider the case of sparsity-based reconstruction of a target range profile. The same approach is used to reconstruct a target angle profile, a target range/angle profile or a target range/angle/angle profile. The parameterization of the manifold is changed to fit each case.

Radar Signal Model for Sparse Reconstruction

In this example, the overcomplete manifold of basis functions for radar is based on a radar that transmits a linear FM (LFM) waveform, but the technique is not limited to LFM systems. For other waveform types, it is only necessary to modify the equations that describe the fast-time measurements parameterized by target range. Other steps remain the same.

Suppose the radar transmits a linear FM waveform defined by $$p(t)=\cos(\Omega_0 t + \pi \gamma t^2) \tag{18}$$

where $\gamma$ is the FM chirp rate. The waveform propagates away from the radar antenna, is reflected from a target at coordinates $r_t=[x_t, y_t, z_t]$, and is observed by a radar antenna having N different phase centers. The radar is moving (the target could be moving too, but we use a stationary target here for simplicity); therefore, define the time-varying position of the qth antenna phase center as $r_q(t)=[x_q(t), y_q(t), z_q(t)]$, and let the time-varying two-way propagation delay from the antenna center ($r_0$) to the target and back to the qth quadrant be denoted by $\tau_q(t)=\tau(r_t,r_q(t))=(|r_t-r_0|+|r_t-r_q(t)|)/c$. When the transmit waveform is delayed by $\tau_q(t)$, mixed with a reference copy of the waveform delayed by $\tau_0$, and lowpass filtered, the resulting quadrature IF signal at the qth phase center is:

$$a(t,q;r_t)=\exp(-j[\Omega_0(\tau_q(t)-\tau_0)-2\pi\gamma t(\tau_q(t)-\tau_0)-\pi\gamma(\tau_q^2(t)-\tau_0^2)]). \tag{19}$$

The delay to a scatterer is essentially constant over the duration of a single pulse; therefore, the time dependence of the first term inside the exponential argument in (19) only has potential significance over multiple pulses. On a single pulse, the significant terms are the second term where the time delay is multiplied by the chirp rate, which is on the order of $10^{12}$ to $10^{14}$, and the first term where the relative delay between phase centers is multiplied by the carrier frequency. The third term is insignificant since very small propagation delays between quadrants are squared to produce extremely small values.

Since there are two different time scales on which terms are significant, we can introduce fast-time and slow-time variables $t_f$ and $t_s$, respectively. Expressing (19) in terms of these two variables yields $$a(t_f,t_s,q;r_t)=\exp(-j[\Omega_0(\tau_q(t_s)-\tau_0)-2\pi\gamma t_f(\tau_q(t_s)-\tau_0)-\pi\gamma(\tau_q^2(t_s)-\tau_0^2)]) \tag{20}$$

The IF signal described by (20) is now sampled in fast time at some IF sample rate $F_s=1/T_s$. This yields a measured sequence over time and space according to $$a(n,t_s,q;r_t)=\exp(-j[\Omega_0(\tau_q(t_s)-\tau_0)+2\pi\gamma nT_s(\tau_q(t_s)-\tau_0)-\pi\gamma(\tau_q^2(t_s)-\tau_0^2)]). \tag{21}$$

And finally, if a constant PRF pulse train is transmitted then the slow-time variable is effectively sampled at the PRF, which yields $$a(n,m,q;r_t)=\exp(j[\Omega_0(\tau_q(mT_r)-\tau_0)-2\pi\gamma nT_s(\tau_q(mT_r)-\tau_0)-\pi\gamma(\tau_q^2(mT_r)-\tau_0^2)]) \tag{22}$$

where $T_r$ is the pulse repetition interval (PRI).

Equation (22) represents the quadrature response measured by the radar over antenna quadrants, fast time, and slow time due to a scatterer at a particular location. If a target can be modeled as consisting of K dominant scatterers or scattering centers, than the total measured signal can be modeled as:

$$x_{IF}(n, m, q) = \sum_{k=1}^{K} \sigma_k \cdot a(n, m, q; r_t(k)). \tag{23}$$

Radar Signal Reconstruction Using a Phase-History Dictionary

Define a measurement vector by rasterizing the quadrant, fast-time, slow-time signal according to:

$$x_{IF} = \begin{bmatrix} x_{IF}(1, 1, 1) \\ x_{IF}(1, 1, 2) \\ x_{IF}(1, 1, 3) \\ x_{IF}(1, 1, 4) \\ x_{IF}(1, 2, 1) \\ \vdots \\ x_{IF}(N_f, N_s, 4) \end{bmatrix}, \tag{24}$$

and define a similar "steering vector" by rasterizing the measurement model for the kth scatterer according to $$a(r_t(k)) = \begin{bmatrix} a(1, 1, 1; r_t(k)) \\ a(1, 1, 2; r_t(k)) \\ a(1, 1, 3; r_t(k)) \\ a(1, 1, 4; r_t(k)) \\ a(1, 2, 1; r_t(k)) \\ \vdots \\ a(N_f, N_s, 4; r_t(k)) \end{bmatrix}. \tag{25}$$

The (noise-free) measurement model is now $$x_{IF} = \sum_{k=1}^{K} \sigma_k a(r_t(k)) = As, \tag{26}$$

which fits the model required for sparse reconstruction if K is small.

An overcomplete dictionary for radar can now be defined by dividing the illuminated ground surface (including target) into a fine grid of cells as shown in FIG. 5. The cells are divided several times more finely than the size suggested by traditional Rayleigh resolution. Each cell has a different position vector $r_t$, and, therefore, a different steering vector $a(r_t(k))$. The cells are ordered, and the steering vector for the kth cell is placed as the kth column of the overcomplete manifold matrix $\tilde{A}$. If a scatterer is located at the kth cell position, then the kth entry of the coefficient vector $\tilde{s}$ should be non-zero. For every cell that does not contain a scatterer, the corresponding entry of the coefficient vector is zero. Thus, we can apply a sparse reconstruction technique to determine $\tilde{s}$, and the non-zero elements of $\tilde{s}$ describe the location and strength of scatterers within the illumination beam.

One way to implement a sparsity constraint is to solve the optimization problem defined by:

$$\min_{\tilde{s}} \|\tilde{s}\|_p \text{ such that } \|x - \tilde{A}\tilde{s}\|_q < \varepsilon \tag{27}$$

where $\|\tilde{s}\|_p$ denotes the $L_p$ norm of $\tilde{s}$ where $p=[0,1]$ and $\|x-\tilde{A}\tilde{s}\|_q < \varepsilon$ denotes the $L_q$ norm of $(x-\tilde{A}\tilde{s})$ where q is approximately equal to 2. In other words, the optimization finds a sufficiently good fit to the measured data that uses the fewest basis functions possible.

Another way to implement a sparsity constraint is to solve the optimization problem defined by $$\min_{\tilde{\sigma}} \|x - \tilde{A}\tilde{s}\|_q \text{ such that } \|\tilde{s}\|_p < \beta \quad (28)$$

The aimpoint computer executes program instructions to solve the optimization problem. There are many known techniques for solving constrained optimization problems of this type. See for example Ewout Van Den Bert et al. "Probing the Pareto Frontier for Basis Pursuit Solutions" SIAM J. SCI. COMPUT. Vol. 31, no 2, pp. 890-912, 2008; Scott S. Chen et al. "Atomic Decomposition by Basis Pursuit" SIAM J. SCI. COMPUT. Vol. 20, No. 1, pp. 33-61, 1998; and Emmanuel J. Candes et al. "An Introduction Compressive Sampling" IEEE SIGNAL PROCESSING MAGAZINE (21) March, 2008, which are hereby incorporated by reference.

Figure 6:
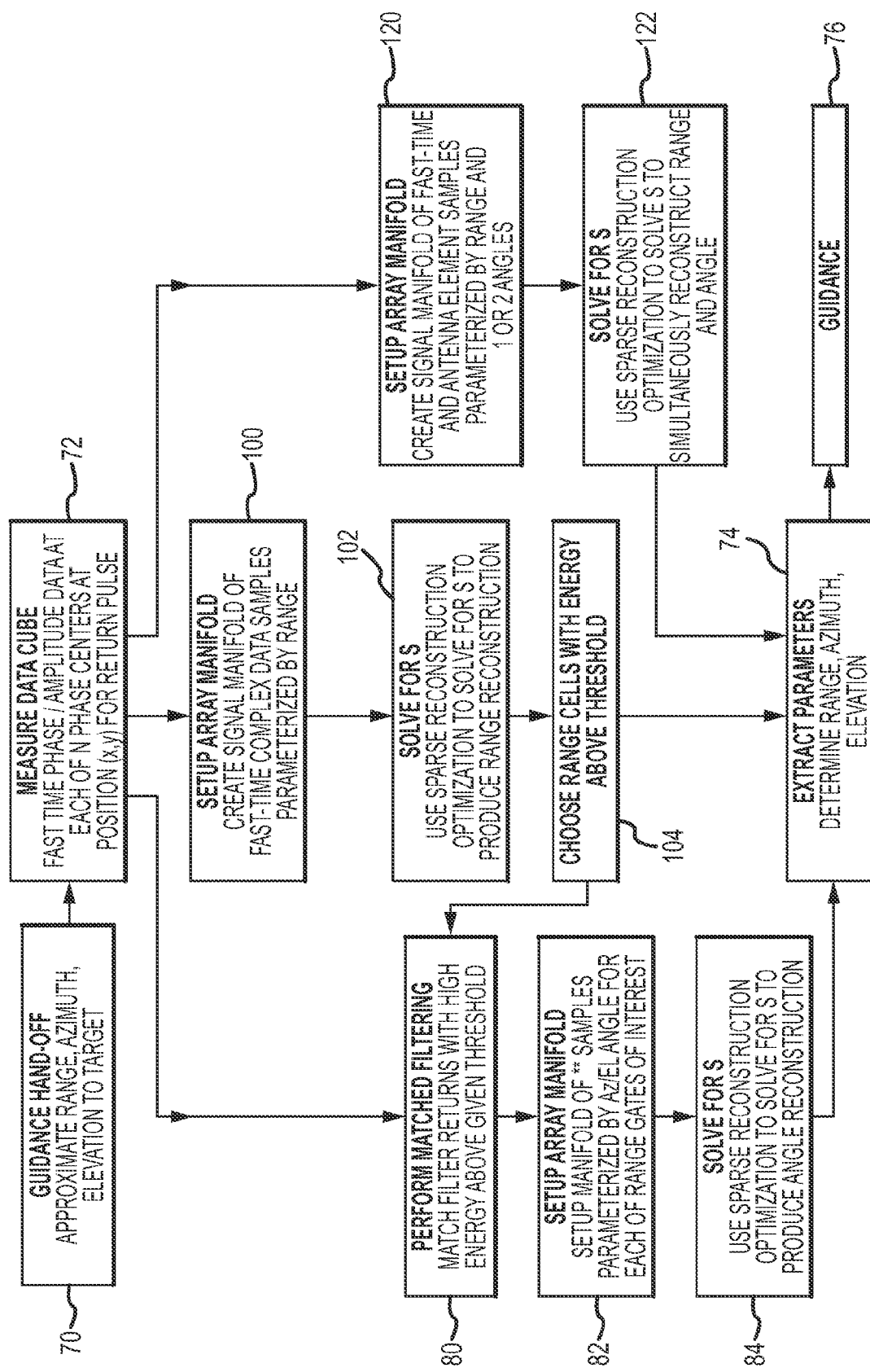
FIG. 6 is a flow diagram illustrating different cases for super resolving range or angle.

As previously mentioned, several versions of the sparse radar signal reconstruction are possible depending on how the data cube is partitioned. Referring now to FIG. 6, possible variations include 1) traditional matched-filter of mean squared-error based range profile reconstruction followed by sparsity-constrained angle reconstruction (left-path of FIG. 6). Exemplary Matched-Filter techniques are described in: Peebles, Peyton Z. Jr. Radar Principles New York, John Wiley & Sons, 1998 and Richard, Mark A. Fundamentals of Radar Signal Processing New York, McGraw-Hill, 2005, which are hereby incorporated by reference;
2) sparsity-constrained reconstruction of the range profile on each antenna channel followed by a second sparse reconstruction of the angle profile in each range bin (center-path of FIG. 6); and
3) joint sparse reconstruction of range and angle(s) profiles via simultaneous use of all measurement degrees of freedom (right-path of FIG. 6).

In all cases, the weapon suitably performs a guidance hand-off of approximate range and Az/El angles to ensure the antenna is pointed at the target (step 70) and transmits an RF pulse to measure a data cube (step 72). Once complete, the aimpoint computer extracts the parameters of range or Az/El angle updates (step 74) and hands off the updates to guidance (step 76).

Along the left-path, the aimpoint computer performs a traditional matched-filtering operation on the data cube (step 80) to generate a range profile. The ranges to target where the range profile exceeds a given threshold identify possible ranges-to-target, hence "range gates" of candidate scatterers. The spacing between range gates is typically equal to the Rayleigh range resolution of c/2*B where c is the speed of light and B is the bandwidth of the pulse. The aimpoint computer sets up an array manifold with number of rows N and columns parameterized by Az and El angles for each of the identified range gates (step 82). The aimpoint computer solves for s using sparse reconstruction optimization (step 84). The non-zero elements of s identify the Az and El angles to the sparse number of scatterers and their relative dominance.

For example, the computer defines a fine grid in angle (for example, fine spacing in azimuth and elevation for an air-to-air application or fine spacing in azimuth for a forward-looking air-to-ground application), and creates a cross-range (or angle) manifold $A_{cr}$. An exemplary manifold 86 parameterized by Az and El angles is shown in FIG. 7. For each cell in the angle grid, a column of the angle manifold matrix is defined by samples of $\exp(-jk(\Delta R_q))$ where $\Delta R_q$ is the extra distance traveled by a plane wave propagating from the direction of the angle cell to the qth antenna channel. The computer performs a sparse reconstruction (e.g. $L_1$ optimization) in angle for a given range using the matched-filter outputs for that range and the angle manifold matrix.

Figure 8B:
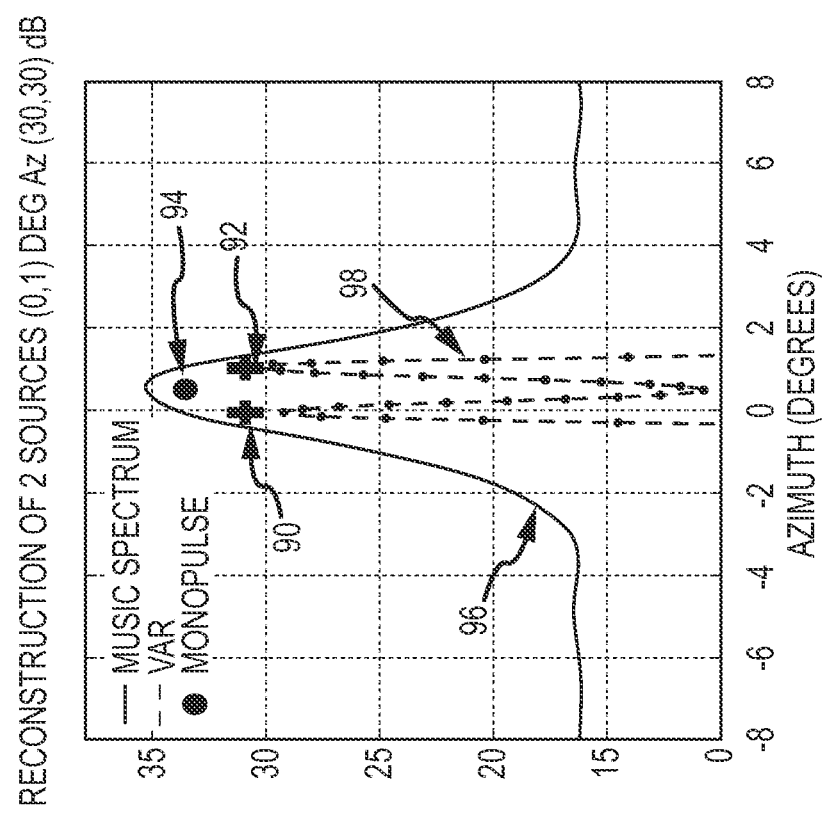
FIGS. 8a and 8b are diagrams of an angle profile comparing sparse reconstruction of the present invention to conventional monopulse and MUSIC approaches.
Figure 8A:
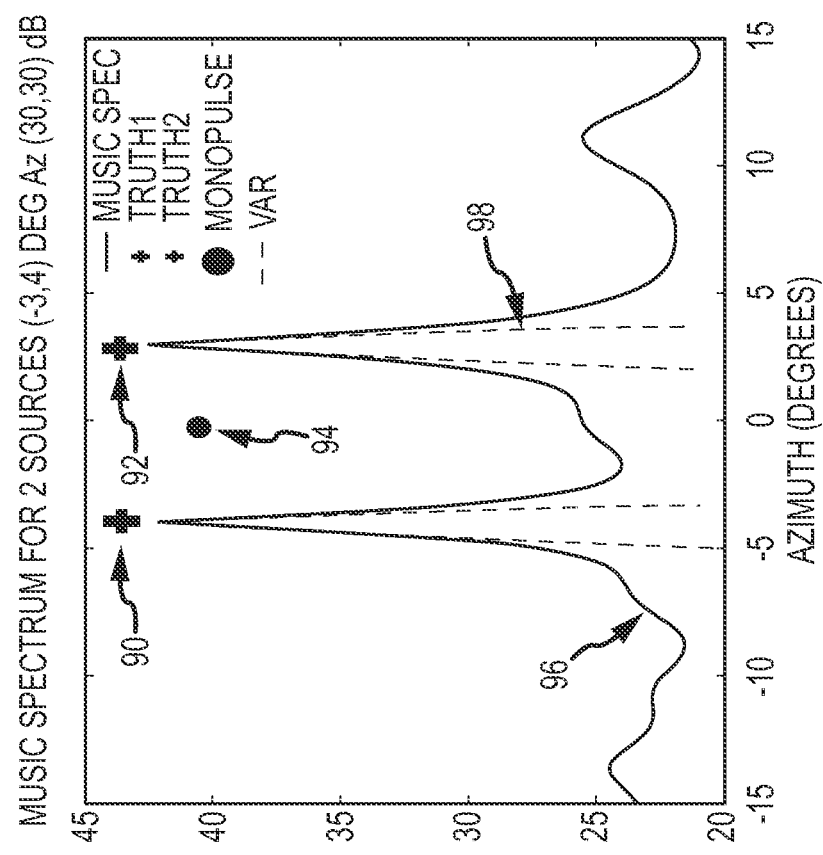

A comparison of the performance of monopulse, MUSIC and VAR is depicted FIGS. 8a and 8b for the simple target scenario depicted in FIG. 1 in which target 14 includes a pair of dominant scatterers S1 and S2. In this example, the true Az angles of the scatterers are marked with crosses 90 and 92. The centroid estimated produced by monopulse is a circle 94, the spectrum produced by music is a solid line 96 and the spectrum produced by VAR is a dashed line 98. As shown in FIG. 8a, monopulse places the centroid 94 between the pair of scatterers and both MUSIC and VAR accurately resolve the pair of scatterers. However, as shown in FIG. 8b, if the scatterers are closely spaced in Az angle, either because they are physically closely-spaced or because the weapon is at a greater range-to-target, MUSIC in unable to resolve the scatterers whereas as VAR is able to resolve the scatterers. VAR exhibits greater capability to resolve closely-spaced or highly-correlated scatterers on a man-made target than monopulse, MUSIC or other existing radar imaging techniques.

Along the center-path, the aimpoint computer sets up an array manifold of $N_f$ fast-time complex data samples parameterized by range (step 100). The computer solves the manifold using sparse reconstruction to uniquely solve for s to produce range reconstruction (step 102). The computer chooses those range cells (or gates) from the data cube with energy above a specified threshold (step 104). For each chosen range gate, the aimpoint computer performs a matched-filtering operation to each of the antenna channels to obtain an output for every channel at that range (step 80) to generate a range profile. The ranges to target where the range profile exceeds a given threshold identify possible ranges-to-target, hence "range gates" of candidate scatterers. The aimpoint computer sets up an array manifold parameterized by Az and El angles for each of the identified range gates (step 82). The aimpoint computer solves for s using sparse reconstruction optimization (step 84). The non-zero elements of s identify the Az and El angles to the sparse number of scatterers and their relative dominance.

For example, suppose that $N_f$ fast-time samples are collected at each of the N quadrants or N channels of the antenna and that the measurements are arranged in an $N_f \times N$ data matrix denoted by X. The following equations summarize the separable target reconstruction approach along the center-path:

A. Create the range-only, fast-time overcomplete manifold $A_{ft}$. For a linear FM transmit pulse with dechirp on receive, each column of the fast-time manifold matrix is obtained by evaluating $\exp(-j2\pi\gamma nT_s(\tau-\tau_0))$ at finely spaced values of the range delay v (to create a fine grid as depicted in FIG. 5). The $N_f$ rows of the matrix correspond to different values of n. For other pulse types, the fast-time manifold can be evaluated in the frequency domain according to $\exp(-j2\pi nF_r(\tau-\tau_0))$. An exemplary range-only manifold 106 is depicted in FIG. 9 Multiple versions of the fast-time manifold are possible depending on pulse type, potential data-reduction steps applied before sparse reconstruction, and so on;

B. Create a "sum channel" data vector according to $x_s=X1$ where 1 is an N×1 vector of ones. Alternatively, a N×1 spatial steering vector can be used to steer the sum beam in a desired direction;

C. Find the high-resolution range profile via $L_1$ or other sparsity-based constrained optimization reconstruction;

D. Apply a threshold to the range profile and identify range delays $\tau_{speak}$ where the threshold is exceeded;

E. For every peak in range, define a fast-time matched filter for that range. The matched filter is an $N_f \times 1$ vector h, with the entries $\exp(j2\pi\gamma nT_s(\tau_{peak}\tau_0))$;

F. For every peak in range, apply the matched filter to each of the antenna channels to obtain an output for every channel at that range;

G. Define a fine grid in angle (for example, fine spacing in azimuth and elevation for an air-to-air application or fine spacing in azimuth for a forward-looking air-to-ground application), and create a cross-range (or angle) manifold $A_{cr}$. An exemplary Az/El manifold 86 is depicted in FIG. 7. For each cell in the angle grid, a column of the angle manifold matrix is defined by samples of $\exp(-jk(\Delta R_q))$ where $\Delta R_q$ is the extra distance traveled by a plane wave propagating from the direction of the angle cell to the nth antenna channel. Perform a sparse reconstruction (e.g. $L_1$ optimization) in angle for a given range using the matched-filter outputs for that range and the angle manifold matrix.

Additional variations include performing the sparsity-constrained angle reconstruction for every range bin rather than peak range bins, and performing the range reconstruction on individual channels rather than a sum channel.

Figure 10:
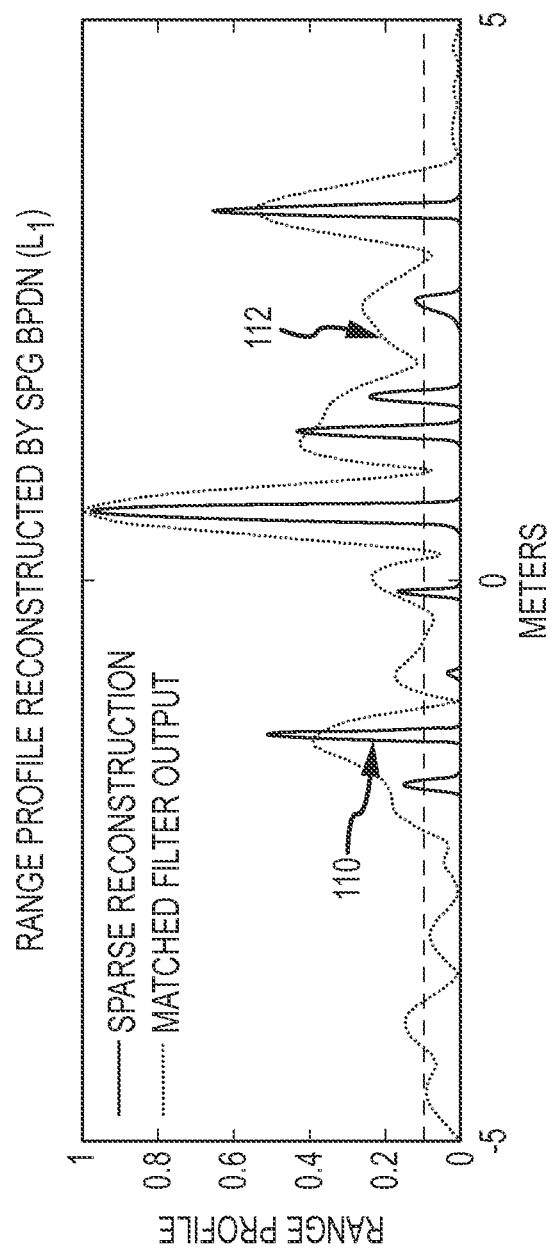
FIG. 10 is a diagram of a range profile comparing sparse reconstruction of the present invention to a conventional matched filter approach.

FIG. 10 shows an example of sparsity-based range profile 110 compared to a matched-filter based range profile 112. Note the lack of sidelobes and narrower peaks in the sparsity-based reconstruction, which provides better resolution of closely spaced scatterers. The sparsity-based reconstruction provides a much better understanding of the true number and range of dominant target scatterers.

Along the right-path, the aimpoint computer sets up an array manifold of fast-time and antenna element data samples parameterized by range and Az or El angles (step 120). The computer solves the manifold using sparse reconstruction to uniquely solve for s to simultaneously produce range and angle reconstruction (step 122). To define the joint range-angle manifold, the illuminated spot on the ground is divided into cells in two dimensions as depicted in FIG. 5. The joint fast-time/antenna phase history for a given cell (measured on a single pulse) is the length-$N_f*N$ vector obtained by evaluating $\exp(-j2\pi\gamma nT_s(\tau-\tau_0))\exp(-jk\Delta R_q)$ at all N channels and $N_f$ time samples.

As the position of the cell changes, so does the range delay and so does the propagation delay to the nth antenna quadrant. Thus, the phase history over fast-time samples and antenna quadrants is entered as a column in the manifold matrix Ã. The number of columns in the matrix is equal to the number of finely-spaced cells within the two-dimensional illumination beam, and the number of rows is $NN_f$. An exemplary manifold 124 for range and Az/El angles is depicted in FIG. 11. Once the manifold is defined, joint range-angle sparse reconstruction can be performed. Because the illuminated area is divided into cells in two dimensions, the coefficients obtained from the sparse reconstruction can be interpreted and displayed as an image.

For an air-to-air application or other application where the ground and target scattering are not confined to lie on a two-dimensional plane, an additional angle parameter can be defined such that the scattering grid becomes a volume. The mathematics do not change except that the manifold matrix column corresponding to a cell in the target volume will be defined by range and two angle parameters.

Figure 12A:
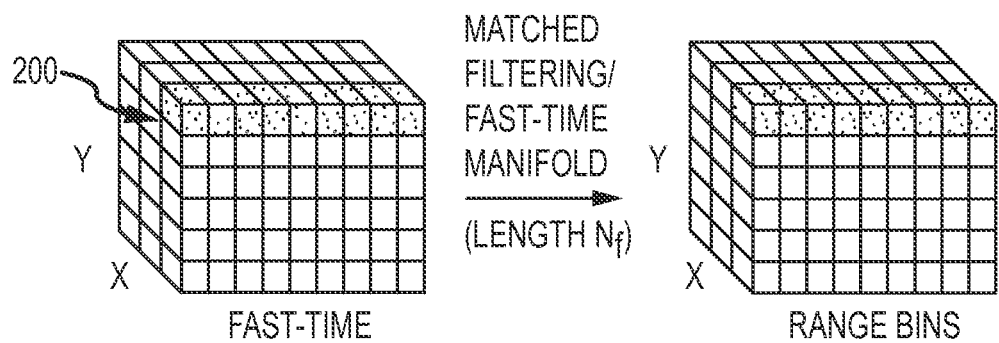
FIGS. 12a through 12c illustrate the data from the data cube that is processed for different manifolds.
Figure 12B:
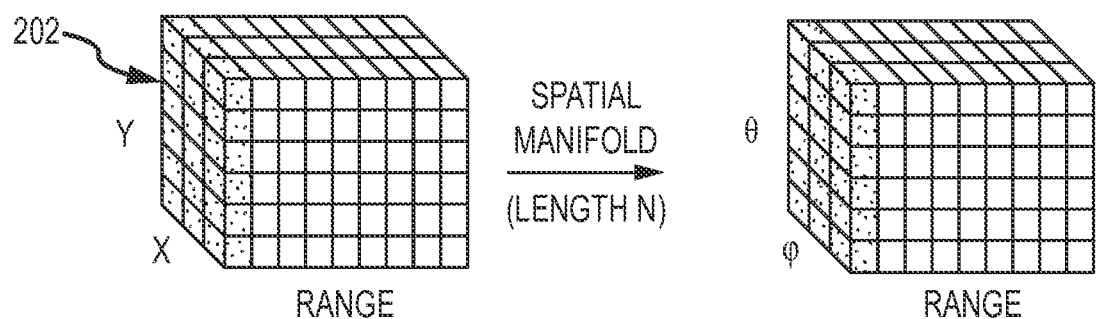
Figure 12C:
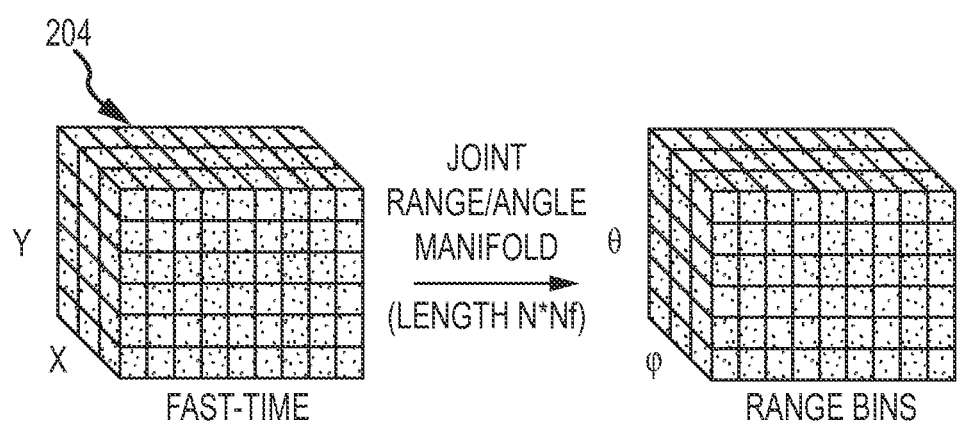

For clarity the data that is processed from the data cube for different cases is illustrated in FIGS. 12a through 12c. FIG. 12a illustrates the data 200 that is processed for either matched filtering for a fast-time range only manifold. FIG. 12b illustrates the data 202 that is processed for a spatial angle only manifold. FIG. 12c illustrates the data 204 that is processed for a jong range/angle manifold.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A method of terminal phase radar guidance of an airborne weapon for determining aimpoint measurements to multiple scatterers on a man-made target, comprising:

transmitting an RF pulse via an antenna array at the target, a bandwidth of said RF pulse or a size of an aperture of the antenna array establishing a Rayleigh resolution as a bound for range or angle measurement resolution, respectfully;

receiving and sampling at the antenna array a return pulse reflected off the multiple scatterers on the target, said antenna array coupled to a spatial array of time-sampled receiver channels to generate a data cube that spans the spatial array and sampling period, each complex value in the data cube having an amplitude and phase;

setting up a system of equations x=As+n in an aimpoint computer, where
each row of data measurement vector x is a measured complex value for one of the receivers,
each column of measurement manifold A is a basis function parameterized by an angle or range to the target, where the number of basis functions is greater than the length of the measurement vector x, said number of basis functions determining a threshold resolution for resolving scatters on the target that exceeds the Rayleigh resolution while making the system of equations underdetermined,
each row of scatterer vector s is a scattering coefficient corresponding to a particular angle or range, and
n is noise;

using the aimpoint computer to execute program instructions for sparse reconstruction to uniquely solve for scattering coefficients s subject to a sparsity constraint on the number of scatterers, a plurality of said scattering coefficients s having non-zero values identifying the range or angle measurements to the scatters on the target; and handing off the updated range or angles measurements for the multiple scatters to the missile's guidance computer.

2. The method of claim 1, wherein the weapon comprises at least one aerodynamic surface to maneuver the weapon, said guidance computer generating a command signal in response to the updated range or angle measurements to manipulate the aerodynamic surface to maneuver the weapon towards the target.

3. The method of claim 1, wherein the system of equations is set up and solved without training data.

4. The method of claim 1, wherein a single RF pulse is transmitted to generate the data cube and update the range or angle measurements.

5. The method of claim 1, wherein multiple RF pulses are transmitted to generate the data cube and update the range or angle measurements.

6. The method of claim 1, wherein the aimpoint computer executes program instructions to $$\min_{\tilde{s}} \|\tilde{s}\|_p$$

such that $\|x-\tilde{A}\tilde{s}\|_q < \epsilon$ where $\|\tilde{s}\|_p$ denotes the $L_p$ norm of $\tilde{s}$ where p=[0,1] and $\|x-\tilde{A}\tilde{s}\|_q < \epsilon$ denotes the $L_q$ norm of $(x-\tilde{A}\tilde{s})$ where q is approximately equal to 2.

7. The method of claim 6, wherein p=1 and q=2.

8. The method of claim 1, wherein the aimpoint computer executes program instructions to $$\min_{\tilde{s}} \|x - \tilde{A}\tilde{s}\|_q$$

such that $\|\tilde{s}\|_p < \beta$.

9. The method of claim 8, wherein p=1 and q=2.

10. The method of claim 1, further comprising matched-filtering the data cube to identify at least one range gate to scatterers on the target, wherein the system of equations is parameterized by at least one said angle for said at least one range gate.

11. The method of claim 10, wherein the system of equations is parameterized by azimuth angle and elevation angle.

12. The method of claim 11. wherein the length of vector x is N.

13. The method of claim 1, wherein a first said system of equations is setup and parameterized by range to target and solved to prove the updated range measurements to the scatterers and then a second said system of equations is setup and parameterized by angle to target for the updated range measurements and solved provide the updated angle measurements to the scatterers.

14. The method of claim 13, wherein the second system of equations is parameterized by azimuth angle and elevation angle.

15. The method of claim 13, wherein the length of vector x is $N_f$ in the first system and N in the second system.

16. The method of claim 13, wherein the solving the first said system of equations provides a range profile, further comprising:
applying a threshold to range profile to identify range gates where the threshold is exceeded;
for each identified range gate, defining a matched filter for that range gate; and
for each identified range gate, applying the matched filter to the data for each receiver channel to generate an updated range measurement for each channel.

17. The method of claim 1, wherein said system of equations is parameterized by range to target and angle to target and solved to simultaneously provide the updated range and angle measurements to the scatters.

18. The method of claim 17, wherein the system of equations is parameterized by range to target, azimuth angle and elevation angle.

19. A method of radar imaging a return RF pulse reflected off a man-made target to provide updated range or angle measurements to the target, comprising:
constructing a manifold using an aimpoint computer for the return RF pulse received at an antenna, said manifold including basis functions parameterized by range or angle to the target, the number of basis functions determining a threshold resolution for resolving scatters on the target that exceeds a Rayleigh resolution set by the bandwidth of the pulse or aperture size of the antenna array while making the manifold underdetermined; and
applying sparse reconstruction using said aimpoint computer to uniquely solve the manifold for scattering coefficients subject to a sparsity constraint on the number of scatterers, a plurality of said scattering coefficients having non-zero values identifying the range or angle measurements to the scatters on the target.

20. A terminal phase radar imaging system for an airborne weapon having at least one aerodynamic surface, comprising:
an antenna array;
a transmitter configured to transmit an RF pulse via an antenna array at a man-made target, a bandwidth of said RF pulse or a size of an aperture of the antenna array establishing a Rayleigh resolution as a bound for range or angle measurement resolution respectfully;
a spatial array of time-sampled receivers coupled to the antenna array, said spatial array configured to receive a return pulse reflected off the multiple scatters on the target to generate a data cube that spans the spatial array and sampling period, each complex value in the data cube having an amplitude and phase;
an aimpoint computer configured to execute first program instructions to setup a system of equations x=As+n where each row of data measurement vector x is a measured complex value for one of the receivers, each column of measurement manifold A is a basis function parameterized by an angle or range to the target, where the number of basis functions is greater than the length of the measurement vector x, said number of basis functions determining a threshold resolution for resolving scatters on the target that exceeds the Rayleigh resolution while making the system of equations underdetermined, each row of scatterer vector s is a scattering coefficient corresponding to a particular angle or range, and n is noise;
said aimpoint computer configured to execute second program instructions for sparse reconstruction to uniquely solve for scattering coefficients s subject to a sparsity constraint on the number of scatterers, a plurality of said scattering coefficients s having non-zero values identifying the range or angle measurements to the scatters on the target; and
a guidance computer configured to respond to the updated range or angle measurements for the multiple scatterers to generate a command signal to manipulate the at least one aerodynamic surface to maneuver the airborne weapon to the target.

* * * * *